United States Patent
Chouhan

(10) Patent No.: US 10,116,512 B2
(45) Date of Patent: Oct. 30, 2018

(54) SERVICE DISCOVERY AND/OR EFFORT ESTIMATION IN NETWORKED COMPUTING ENVIRONMENTS

(71) Applicant: Oracle International Corporation, Redwood Shores, CA (US)

(72) Inventor: Nirdosh Chouhan, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 591 days.

(21) Appl. No.: 14/525,575

(22) Filed: Oct. 28, 2014

(65) Prior Publication Data

US 2016/0013989 A1 Jan. 14, 2016

Related U.S. Application Data

(60) Provisional application No. 62/023,162, filed on Jul. 10, 2014.

(51) Int. Cl.
| | |
|---|---|
| *G06F 15/16* | (2006.01) |
| *H04L 12/24* | (2006.01) |
| *H04L 12/26* | (2006.01) |
| *H04L 29/08* | (2006.01) |
| *H04L 29/06* | (2006.01) |
| *G06F 9/54* | (2006.01) |

(52) U.S. Cl.
CPC ............ *H04L 41/12* (2013.01); *G06F 9/547* (2013.01); *H04L 43/08* (2013.01); *H04L 67/02* (2013.01); *H04L 67/16* (2013.01); *H04L 67/42* (2013.01)

(58) Field of Classification Search
CPC .......... H04L 67/16; H04L 41/12; G06F 9/547
See application file for complete search history.

(56) References Cited

U.S. PATENT DOCUMENTS

| | | | |
|---|---|---|---|
| 7,213,234 B1 | 5/2007 | Below | |
| 7,627,855 B2* | 12/2009 | Inoue | G06F 8/36 717/120 |
| 7,657,867 B2 | 2/2010 | Ball et al. | |
| 7,743,369 B1 | 6/2010 | Srinivasan | |
| 9,652,206 B2* | 5/2017 | Windley | G06F 8/40 |
| 2003/0159130 A1* | 8/2003 | Broussard | G06F 8/71 717/120 |
| 2007/0226697 A1* | 9/2007 | Barsness | G06F 11/3612 717/127 |

(Continued)

OTHER PUBLICATIONS

Upadhyaya et al, Migration of SOAP-based services to RESTful Services.*

(Continued)

*Primary Examiner* — Douglas B Blair
(74) *Attorney, Agent, or Firm* — Trellis IP Law Group, PC

(57) ABSTRACT

A system and method for facilitating discovery of a software resource. The example method includes employing one or more predicates to query one or more services in a computing environment, producing a first result, wherein the first result indicates one or more target services; using reflection to analyze the one or more target services; producing a second result; analyzing the second result to determine if the one or more services meet a criterion for conversion to a Representational State Transfer (REST) service, yielding a third result; and providing one or more indications of one or more discovered services based on the third result.

20 Claims, 3 Drawing Sheets

(56) References Cited

U.S. PATENT DOCUMENTS

| | | | |
|---|---|---|---|
| 2009/0171474 A1* | 7/2009 | Birze .................. | G05B 19/042 700/3 |
| 2009/0222429 A1 | 9/2009 | Aizenbud-Reshef et al. | |
| 2010/0325609 A1* | 12/2010 | Windley ................. | G06F 9/541 717/106 |
| 2011/0161477 A1* | 6/2011 | Kowalski ............ | H04L 67/2823 709/223 |
| 2011/0283264 A1 | 11/2011 | Gagliardi | |
| 2014/0033170 A1 | 1/2014 | Nimashakavi et al. | |
| 2014/0156828 A1* | 6/2014 | Pasternak ......... | H04L 29/08099 709/224 |
| 2014/0157228 A1* | 6/2014 | Pasternak ................. | G06F 8/30 717/106 |
| 2014/0372970 A1* | 12/2014 | Broussard ................. | G06F 8/30 717/106 |
| 2015/0378691 A1* | 12/2015 | Chouhan ................... | G06F 8/31 717/106 |

OTHER PUBLICATIONS

Kusumoto et al, Estimating Effort by USE CAse Points: Method, Tool and Case Study.*

Kozlenkov et al, "A frame work for Architecture-drive Service Discovery".*

"Essentials, Part 1, Lesson 1: Compiling & Running a Simple Program", retrieved on Jun. 27, 2018, http://www.oracle.com/technetwork/java/compile-136656.html.*

"Trail: The Reflection API", retreived on Jun. 27, 2018, https://docs.oracle.com/javase/tutorial/reflect/.*

McCluskey, "Using Java Reflection", Jan. 1998, http://www.oracle.com/technetwork/articles/java/javareflection-1536171.html.*

Michael Athanasopoulos, et al; Identification of REST-like Resources from Legacy Service Descriptions; obtained at http://ieeexplore.ieee.org/xpl/articleDetails.jsp?tp=&arnumber=5645561&pageNumber%3D2%26queryText%3DREST+service+dicovery; 2010 IEEE; 5 pages.

Markku Laitkorpi, et al; A UML-based Approach for Abstracting Application Interfaces to REST-like Services; obtained at http://ieeexplore.ieee.org/xpl/articleDetails.jsp?tp=&arnumber=4023984&queryText%3DREST+Services+Modeling; 2006 IEEE; 10 pages.

Asil A. Almonaies, et al.; Legacy System Evolution towards Service-Oriented Architecture; obtained at http://research.cs.queensu.ca/home/cordy/Papers/ACD_MigToSOA_SOAME10.pdf; downloaded via circa Mar. 25, 2014; 10 pages.

Nusiba Abdalrhman, et al.; Enabling Complexity Use Case Function Point on Service-Oriented Architecture; obtained at http://ieeexplore.ieee.org/xpl/articleDetails.jsp?tp=&arnumber=6633996&queryText%3Dfunction+point+estimation+for+REST+service; 2013 IEEE; 6 pages.

Reflection API; obtained at http://www.google.co.in/url?sa=t&rct=j&q=&esrc=s&source=web&cd=4&cad=rja&uact=8&ved=0CEEQFjAD&url=http%3A%2F%2Fbigfoot.cs.upt.ro%2F~ioana%2Farhit%2F2013%2Frefl.ppt&ei=INwvU_H_IYv2oASaj4G4AQ&usg=AFQjCNEG2AodTiCF2Ej94EUdIxxNQfS8wA&bvm=bv.62922401,d.cGU; downloaded via circa Mar. 25, 2014; 34 pages.

Creating Web Services from Legacy Host Programs; obtained at http://ieeexplore.ieee.org/xpl/articleDetails.jsp?arnumber=1234009; downloaded via circa Mar. 25, 2014; 2 pages.

Integrating Legacy Software Into a Service Oriented Architecture; obtained at http://ieeexplore.ieee.org/xpl/login.jsp?tp=&arnumber=1602353&url=http%3A%2F%2Fieeexplore.ieee.org%2Fxpls%2Fabs_all.jsp%3Farnumber%3D1602353; downloaded via circa Mar. 25, 2014; 2 pages.

Edward Stehle; Migration of Legacy Software to Service Oriented Architecture; obtained at http://citeseerx.ist.psu.edu/viewdoc/download?doi=10.1.1.84.6098&rep=rep1&type=pdf;downloaded via circa Mar. 25, 2014; 5 pages.

David Longstreet; Function Points Analysis; obtained at http://www.softwaremetrics.com/Function%20Point%20Training%20Booklet%20New.pdf; downloaded via circa Mar. 25, 2014; 111 pages.

Jonathan M. Hollander; "Data-driven API Creation and Processing in Node.js"; 7 pages; Jul. 26, 2013.

Kozelnkov, A., et al.—"A Framework for Architecture-driven Service Discovery"; Proceedings of the 2006 International Workshop on Service-Oriented Software Engineering; May 2006; 7 pages.

* cited by examiner

SERVICE DISCOVERY AND/OR EFFORT ESTIMATION IN NETWORKED COMPUTING ENVIRONMENTS

CROSS REFERENCES TO RELATED APPLICATIONS

This application claims priority from U.S. Provisional Patent Application Ser. No. 62/023,162, entitled SERVICE DISCOVERY AND EFFORT ESTIMATE AUTOMATION, filed on Jul. 10, 2014, which is hereby incorporated by reference as if set forth in full in this application for all purposes.

This application is related to the following application, U.S. patent application Ser. No. 14/315,248, entitled REST SERVICE SOURCE CODE GENERATION, filed on Jun. 25, 2014, which is hereby incorporated by reference, as if set forth in full in this specification.

BACKGROUND

The present application relates to software and more specifically to systems and methods for facilitating discovering and analyzing software computing resources, such as web services or other remotely accessible software.

Remotely accessible software is employed in various demanding applications, including enterprise cloud-based software accessible to distributed clients, such as mobile devices. In many enterprise computing environments, different software systems must exchange data, such as via web services or via other mechanisms for communicating data between software systems via the Internet. Such computing environments often demand efficient mechanisms for analyzing existing services and Application Programming Interfaces (APIs), such as to determine whether the services and/or APIs should be upgraded or otherwise modified to meet changing network demands.

Systems and method for discovering and analyzing services and APIs of networked computing environments can be particularly important in cloud computing environments, where many computing resources may interact. For example, certain cloud computing environments may employ a certain type of Java service or API, which is to be replaced with or converted to a different type of service, e.g., a Representational State Transfer (REST) service. In a large networked computing environment, finding, i.e., discovering, the Java services and/or APIs for conversion to REST services, can be difficult.

Conventionally, the task of discovering Java APIs and services to be converted to REST services involves manually analyzing each service and method to determine if it can be converted to a REST service, and then listing all DTOs (Data Transaction Objects) to be converted. However, identifying convertible Java APIs and identifying DTOs using such conventional methods can be error prone; can result in not discovering important services; and may involve inefficient duplicative effort.

SUMMARY

An example method for facilitating discovery of a software resource, such as a Java service or API, includes employing one or more predicates to query one or more services in a computing environment, producing a first result in response thereto, wherein the first result indicates one or more target services; using reflection to analyze the one or more target services; producing a second result in response thereto; analyzing the second result to determine if the one or more services meet a criterion for conversion to a Representational State Transfer (REST) service, yielding a third result; and providing one or more indications of one or more discovered services based on the third result.

In a more specific embodiment, the example method employs computer code in a JAR (Java ARchive) file to implement the method, which further includes employing a predicate Java Application Programming Interface (API) to facilitate implementing the step of employing. A reflection Java API facilitates implementing the step of using reflection.

The one or more indications of one or more discovered services includes a list that indicates one or more packages, classes, and/or methods that meet predetermined criteria for conversion of the one or more services to one or more REST services. The criteria may include criteria specified via the one or more predicates.

The example method further includes analyzing a package of the one or more services to determine if one or more duplicate Data Transaction Objects (DTOs) occur in the package. Any duplication of DTOs that may result from conversion of a Java service to a REST service is/are flagged.

The example method may further include employing a Java API to measure function point complexity for a particular candidate Java service to be converted to a REST service. The function point complexity measurement may be based on a count of function points of a Java service being analyzed via the Java API. The function point complexity may be employed to calculate an effort estimate, which can be a metric indicating a measurement of effort required to convert a discovered service to a REST service.

In summary, certain embodiments disclosed herein provide a tool, which may be implemented via a Java API, which facilitates automating finding services that can be converted to REST services or APIs. Additional analysis, such as complexity analysis, REST conversion effort estimates, and so on may further facilitate efficient service discovery, analysis, and conversion.

Software that implements certain embodiments discussed herein may provide an output file that includes service analysis results, including how many services may be converted to REST services, what services may be converted to REST services, and which packages should be converted to work with REST services, and so on.

A further understanding of the nature and the advantages of particular embodiments disclosed herein may be realized by reference of the remaining portions of the specification and the attached drawings.

DETAILED DESCRIPTION OF EMBODIMENTS

For the purposes of the present discussion, a computing environment may be any collection of computing resources used to perform one or more tasks involving computer processing. An enterprise computing environment may be any computing environment used for a business or organization. An example enterprise computing environment includes various computing resources distributed across a network and may further include private and shared content on intranet web servers, databases, files on local hard discs or file servers, email systems, document management systems, portals, and so on.

A computing resource, also simply called resource herein, may be any aspect or feature of a computing system or environment, such as a computer network, that can be identified, e.g., via a URI or other mechanism. Similarly, a software resource may be any collection of computer code that is implemented via a computing system. Certain software resources may represent web resources.

For the purposes of the present discussion, a web resource may be anything that can be named and addressed via a computer network, including computing language classes (e.g., Java classes), objects, web services, and so on. In general, anything that is referenced via a Uniform Resource Identifier (URI) or web address, such as a URL, can be considered a web resource. A URI may be may be any string of characters specifying a network address.

Enterprise software may be any set of computer code that is adapted to facilitate implementing any enterprise-related process or operation, such as managing enterprise resources, managing customer relations, and so on. The terms "enterprise software" and "enterprise application" may be employed interchangeably herein. However, an enterprise application may include one or more enterprise software modules or components, such as user interface (UI) software modules or components.

For clarity, certain well-known components, such as hard drives, processors, operating systems, power supplies, Internet Service Providers (ISPs), integration repositories, runtime system, service loaders, and so on, are not specifically called out in the figures. However, those skilled in the art with access to the present teachings will know which components to implement and how to implement them to meet the needs of a given implementation.

Figure 1:
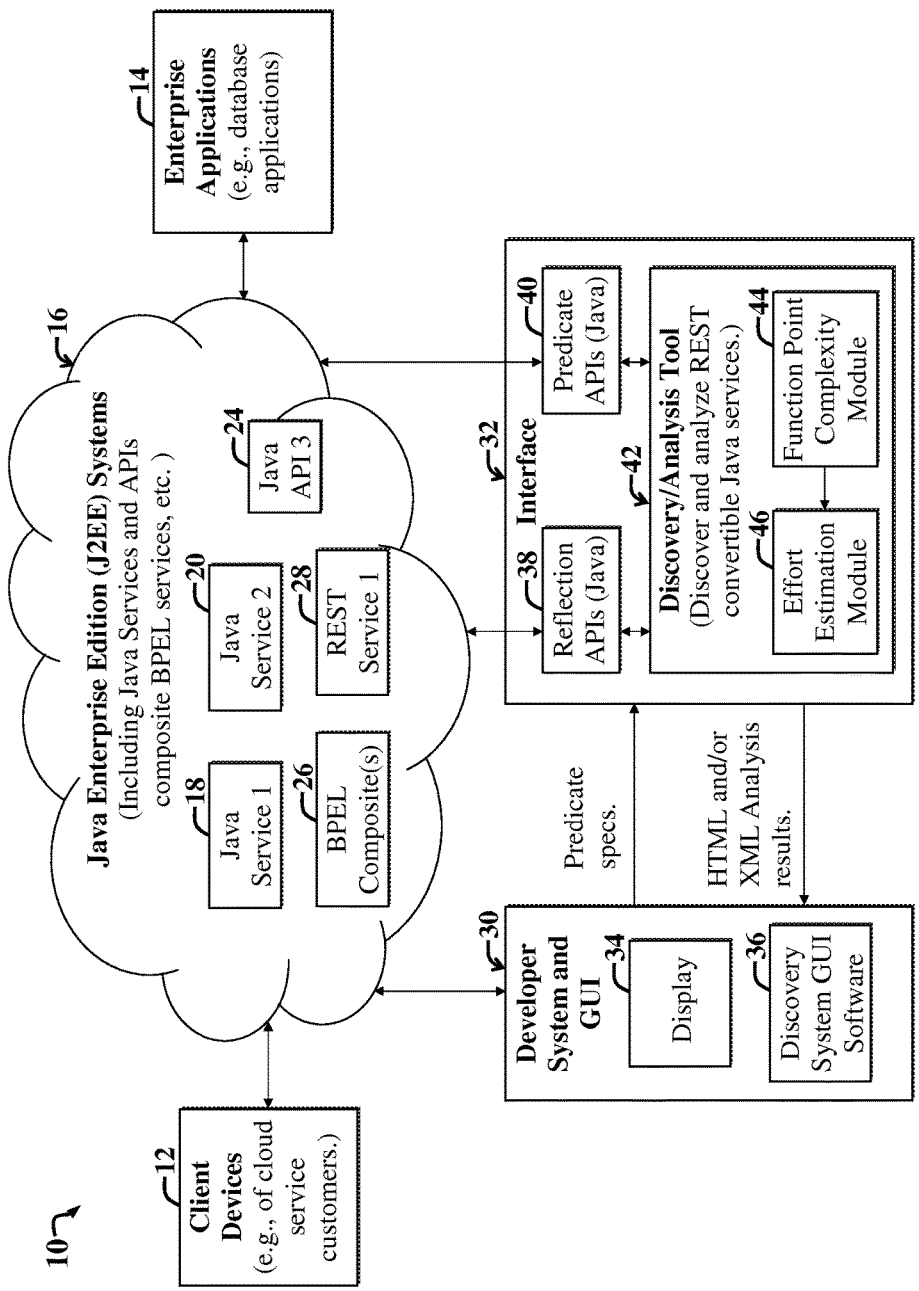
FIG. 1 is a diagram illustrating a first example system enabling automatic discovery of Java services and APIs in a networked computing environment.

FIG. 1 is a diagram illustrating a first example system 10 enabling automatic discovery of Java services and APIs in a networked computing environment. The example system 10 includes one or more JEE (Java Platform Enterprise Edition) systems 16 accessible to a developer system 30, e.g., via an example interface 32.

Note that in general, various modules of the system 10 may be grouped or arranged differently than shown, without departing from the scope of the present teachings. Similarly, interconnections between modules may vary depending upon the needs of a given implementation.

For the purposes of the present discussion, a web service may be any software function or operation activated or implemented via software running on a server in response to a signal, e.g., a request message, sent from a client to the server via a network, such as the World Wide Web. The software that implements a web service operation may also be called a web service, software service, or simply service herein.

The example JEE system(s) supports various Java services 18, 20, a converted REST service 28 (that has been converted from a Java service), a Business Prosecution Language (BPEL) composite 26, and a Java API 24. In the present example embodiment, the JEE systems 16 and accompanying components 18-28 provide software functionality to facilitate interaction between client devices 12 and enterprise applications 14.

Note that the term "Java service" as used herein refers to any Java service that is not a REST service. The developer system 30 and interface 32 are adapted to employ reflection and predicate APIs 38, 40 to discover which of the services and APIs 18-26 are suitable for conversion to REST services, such as the REST service 28, as discussed more fully below.

In the present example embodiment, the example REST service 28 represents a RESTful web service implemented in accordance with the Jersey RESTful Web Services framework. The Jersey RESTful Web Services framework is an open source framework facilitating implementation of web services in Java in accordance with JAX-RS (Java API for RESTful Web Services) APIs, consistent with Java Specification Requests (JSRs) 311 and 339. A Jersey implementation of intercommunicating web resources provides a library that facilitates implementing RESTful web services in Java servlet containers.

The example developer system 30 includes a User Interface (UI) display 34 in communication with discovery system GUI software 36, which is adapted to generate instructions for rendering, via the display 34, service discovery results retrieved from a discovery/analysis tool 42 of the interface 32.

The example interface 32 is adapted to run the discovery/analysis tool 42, which includes computer code for using one or more Java reflection APIs 38 and Java predicate APIs 40 to analyze the Java-based entities 18-28; particularly the Java services 18, 20, to determine if they are suitable for conversion to REST services.

Exact details as to what constitutes a Java service that is suitable for conversion to a REST service are implementation specific, and may vary. For example, certain organizations may decide to invest more heavily in converting Java services to REST services and may, consequently, be willing to spend more effort converting some services than other organizations might. Those skilled in the art with access to the present teachings may readily determine appropriate criteria for selection of Java services for conversion to REST services and apply the criteria to search the JEE computing system(s) 16 for suitable services. The criterion or criteria for discovering candidate services for analysis may be provided via use of predicates, as discussed more fully below.

In the present example embodiment, the discovery/analysis tool 42 includes computer code for implementing function point complexity analysis 44 and effort estimation 46 based on the function point complexity analysis results. Computer code for implementing the discovery/analysis tool 42 may be maintained in a Java ARchive (JAR) file.

Note that while the function point complexity module 44 and effort estimation module 46 are shown running on an interface 32, that embodiments are not limited thereto. For example, the analysis modules 44, 46 or portions thereof may be implemented via computer code running on the developer system 30 as part of the discovery system GUI software 36.

While the discovery/analysis tool 42 is shown only including the function point complexity module 44 and the effort estimation module 46, that in practice, additional functionality and resources may be employed, such as data storage for storing package information; computer code for performing duplicate Data Transaction Object (DTO) (also called Data Transfer Object) analysis; computer code for marshalling data from a data store into eXtensible Markup Language (XML) and/or HyperText Markup Language (HTML) files, and so on, may be implemented via or in concert with the discover/analysis tool 42.

The resulting HTML file contains discovery and analysis results, which are consumable and/or readable and displayable via the developer system and GUI 30. Note that the developer system 30 may be implemented as one of the client devices 12, without departing from the scope of the present teachings.

In general, services and associated information indicated in XML or HTML files retrieved by the developer system 30 represent REST convertible Java services. In the present example embodiment, the discovered services are maintained in a JAR file that is accessible to a Java Virtual Machine (JVM) at runtime.

Figure 2:
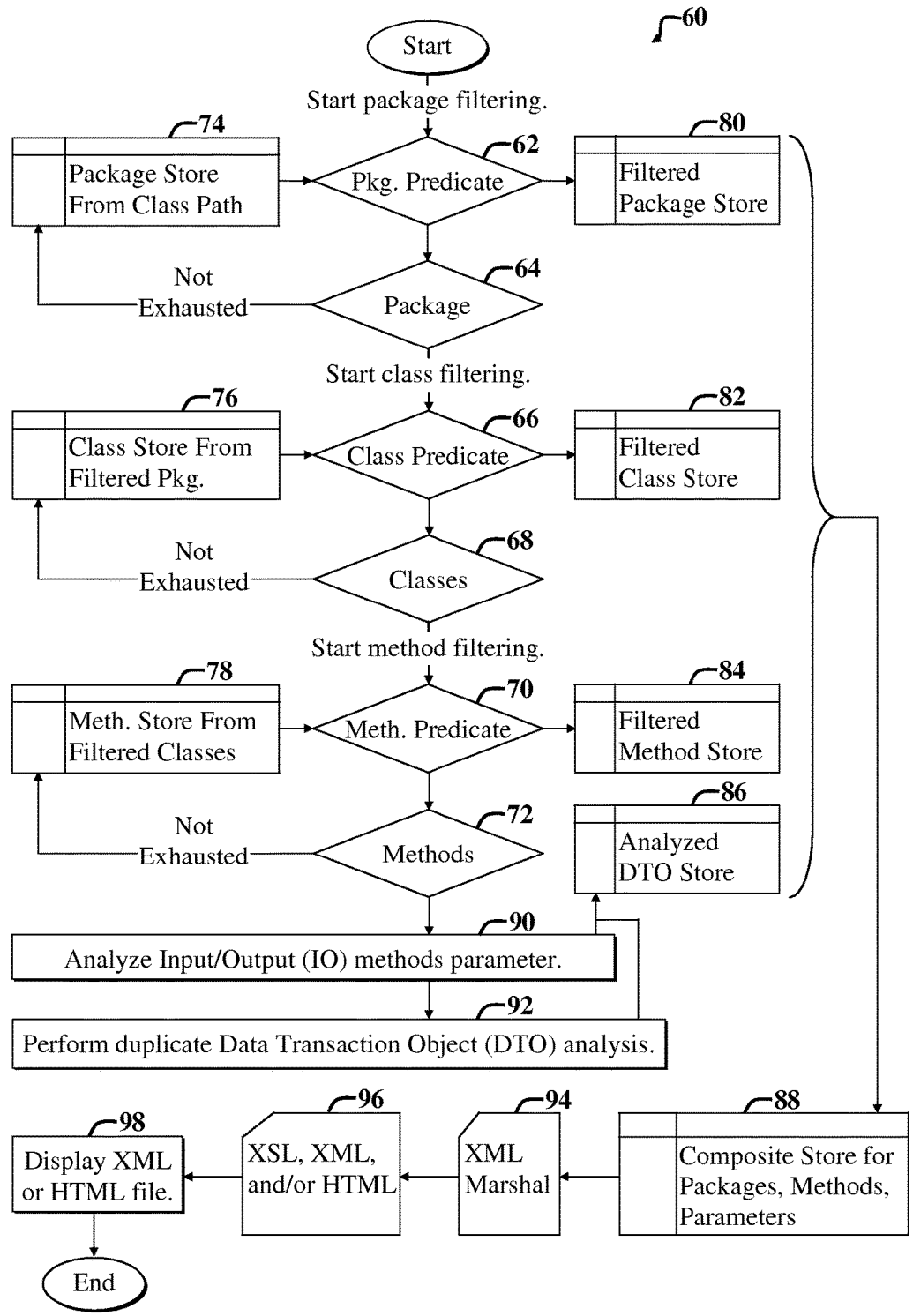
FIG. 2 is a flow diagram of an example process adapted for use with the embodiments of FIG. 1.

FIG. 2 is a flow diagram of an example process 60 adapted for use with the embodiments of FIGS. 1 and 2. With reference to FIGS. 1 and 2, the method 60 may be implemented substantially via computer code running on the interface 32 and/or developer system 30 FIG. 1.

The process 60 includes initiating package filtering by obtaining one or more package predicates 62 to be applied to a Java package 64 associated with Java services to be analyzed for conversion to REST services.

Java services represented by classes of the Java service package 64 of the package store 74 are obtained from a class path. In general, existing services are provided as input to the process 60 as compiled code that is configured in the class path. A class path may be information informing a JVM where to look for certain classes and packages.

For the purposes of the present discussion, a Java package may be a mechanism for grouping or organizing Java classes used to implement Java applications or services. Java packages may be used group or store similarly categorized classes to facilitate organization of the classes.

A package predicate 62, which may be specified by a developer or automatically, is employed to filter package(s) 64 based on packages obtained from a package store 74. Packages matching criterion or criteria specified via the package predicate 62 are indicated in a filtered package store 80.

After Java packages are filtered based on any package predicate 62, class filtering begins. Class filtering includes applying a class predicate 66 to classes 68 of filtered packages of the filtered package store 80, which are maintained via a class store 76. All filtered classes that match a condition specified by the class predicate 66 are maintained in a filtered class store 82.

Next, filtering begins, whereby methods of a method store 78 representing methods 72 from filtered classes of the filtered class store 82 are checked for matching a condition of a specified method predicate 70. Methods matching the criterion or criteria are maintained in a filtered method store 84.

Subsequently, Input/Output (I/O) method parameters are analyzed in an initial analysis step 90, as part of complexity analysis. The results of the analysis step 90 may or include metrics, such as function point complexity.

Duplicate Data Transaction Object (DTO) analysis 92 is then performed. Note that the DTO analysis 92 may be performed in parallel with the analysis step 90, without departing from the scope of the present teachings. The DTO analysis may include specifying all DTO objects that will be duplicative upon conversion to REST services if an adjustment is not made to remove the duplicity. Results of the initial analysis 90 and DTO analysis 92 may be stored in an analyzed DTO store 86.

Filtered data and/or analysis results from the various stores 80-86 are then combined into a composite store 88, which maintains information pertaining to packages, methods, parameters, and so on, of discovered services. This data is then selectively marshalled, e.g., via an XML marshal 94, into eXtensible Stylesheet Language (XSL), and/or HTML or other markup language 96 readable in a displaying step 98. The displaying step 98 may employ a browser to read output from the marshalling step 94.

Figure 3:
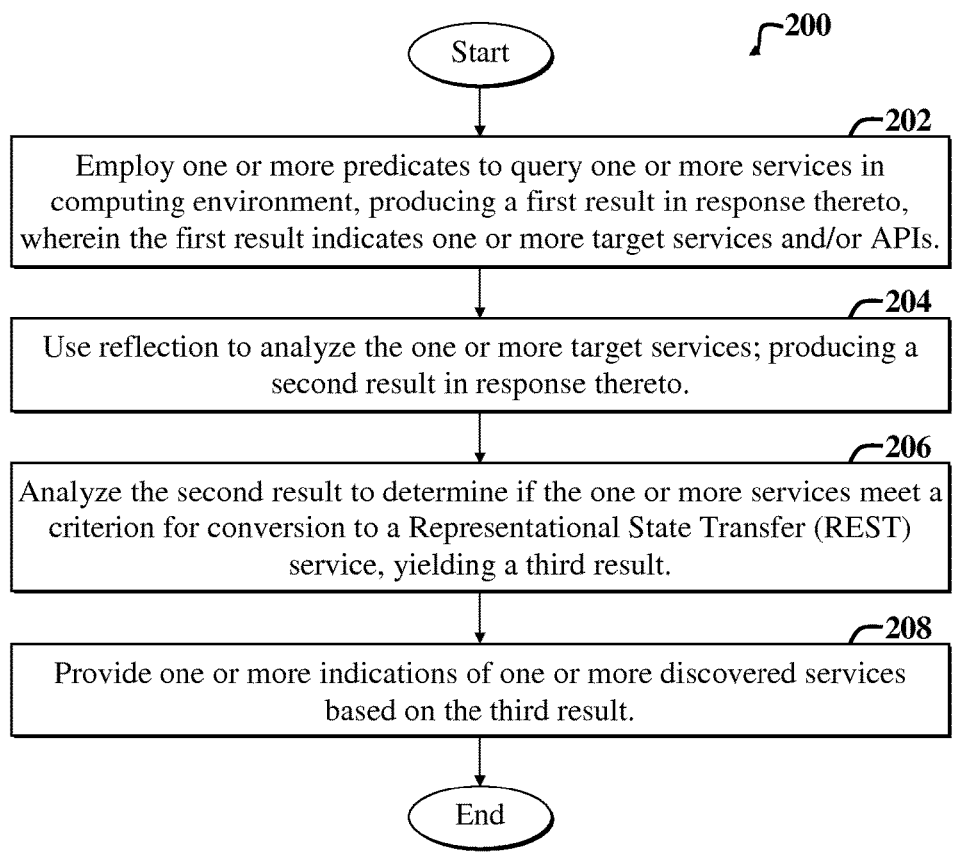
FIG. 3 is a flow diagram of an example generalized method adapted for use with the embodiments of FIGS. 1-2.

FIG. 3 is a flow diagram of an example generalized method 200 adapted for use with the embodiments of FIGS. 1-2. The example method 200 includes a first step 202, which involves employing one or more predicates to query one or more services in computing environment, producing a first result in response thereto, wherein the first result indicates one or more target services.

A second step 204 includes using reflection to analyze the one or more target services; producing a second result in response thereto.

A third step 206 includes analyzing the second result to determine if the one or more services meet a criterion for conversion to a Representational State Transfer (REST) service, yielding a third result.

A fourth step 208 includes providing one or more indications of one or more discovered services based on the third result.

Note that various steps of the method 200 may be modified, omitted, augmented, or rearranged, without departing from the scope of the present teachings. For example, the method 200 may further include employs computer code in a JAR (Java ARchive) file to implement the method, and employing a predicate Java API to facilitate implementing the step of employing. A reflection Java API may facilitate implementing the step of using reflection.

The one or more indications of one or more discovered services may include a list that indicates one or more packages, classes, and/or methods that meet predetermined criteria for conversion of the one or more services to one or more REST services. The criteria may include criteria specified via the one or more predicates.

The method 200 further include analyzing a package of the one or more services to determine if one or more duplicate DTOs occur in the package. Any duplication of DTOs that may result from conversion of a Java service to a REST service may then be flagged.

The example method 200 may further include employing a Java API to measure function point complexity for a particular candidate Java service to be converted to a REST service. The function point complexity measurement may be based on a count of function points of a Java service being analyzed via the Java API. The function point complexity may be employed to calculate an effort estimate, which can be a metric indicating a measurement of effort required to convert a discovered service to a REST service.

In summary, certain embodiments disclosed herein provide a tool, which may be implemented via a Java API, which automates finding services that can be converted to REST services or APIs. The example tool provides function point complexity metrics, which can be directly used for effort estimation. The example tool can be consumed by virtually any Java program to obtain various program details.

The complexity analysis enabled via certain embodiments discussed herein may provide various metrics and indicators to enable developers and administrators to decide whether to proceed with conversion of a service to a REST service. Additional mechanisms facilitate automatically analyzing service packages and flagging or indicating any duplicate Data Transaction Objects (DTOs).

Software that implements certain embodiments discussed herein may provide an output file that includes service analysis results, including how many services may be converted to REST services, what services may be converted to REST services, and which packages should be converted to work with REST services, and so on.

Although the description has been described with respect to particular embodiments thereof, these particular embodiments are merely illustrative, and not restrictive. For example, while certain embodiments discuss analysis of Java services or APIs to facilitate determining suitability of the services or APIs for conversion to Jersey REST services, implementations are not limited thereto. Certain embodiment discussed herein may be readily adapted to facilitate determining suitability of different types of services for conversion to other types of services, such as RestEasy or WildFly service implementations.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise.

Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method for facilitating discovery of a software resource in a computing environment that includes a client device operating in a system including one or more client devices in communication with a server system, wherein the server system executes webpage software, wherein the webpage software provides webpage information accessible to the client device, the client device executing steps of the method, the method comprising:
    employing one or more predicates to query one or more initial services in the computing environment, wherein the query includes filtering based on one or more packages, one or more classes, and one or more methods;
    producing a first result in response thereto, wherein the first result indicates one or more target services that are compiled code;
    using reflection to analyze the one or more target services;
    producing a second result in response to the using of the reflection;
    analyzing the second result to determine if the one or more target services meet a criterion for conversion to one or more Representational State Transfer (REST) services, yielding a third result in response thereto, wherein the analyzing includes function point complexity and effort estimation;
    providing indications of one or more discovered services based on the third result; and
    converting the one or more discovered services into one or more REST services by automatically generating computer code implementing the REST services yielded in the third result.

2. The method of claim 1, further comprising using computer code in a Java ARchive (JAR) file.

3. The method of claim 1, further including employing a predicate Java application programming interface (API) to facilitate implementing the step of employing.

4. The method of claim 3, further including employing a reflection Java API to facilitate implementing the step of using reflection.

5. The method of claim 1, wherein the one or more indications include a list of the one or more packages, the one or more classes, and the one or more methods that meet the criterion for inclusion in a process to convert the one or more discovered services to the one or more REST services.

6. The method of claim 1, further including specifying a criterion via the one or more predicates.

7. The method of claim 6, further including analyzing a package of the one or more discovered services to determine if one or more duplicate data transfer objects (DTOs) occur in the package.

8. The method of claim 1, further including employing a Java application programming interface (API) to implement the steps of employing, using, and analyzing.

9. The method of claim 8, wherein the one or more initial services include one or more Java services, which are adapted to provide output indicating one or more characteristics of the one or more Java services in response to a signal from the API.

10. The method of claim 9, wherein the one or more predicates include one or more package predicates, and wherein a package predicate filters packages.

11. The method of claim 10, wherein the one or more package predicates includes a wildcard predicate.

12. The method of claim 9, wherein the one or more predicates include one or more class predicates, and wherein a class predicate filters classes.

13. The method of claim 12, wherein the one or more predicates is adapted to indicate whether a name of the one or more services meets a name criterion.

14. The method of claim 9, wherein the one or more predicates include one or more method predicates, and wherein a method predicate filters methods.

15. The method of claim 8, further including using the Java API to measure function point complexity.

16. The method of claim 15, further including employing a function point complexity measurement to calculate an effort estimation, wherein the effort estimation represents a metric indicating effort to convert a discovered service to a REST service, and wherein function point complexity measurement includes a count of function points of a Java service being analyzed via the API.

17. The method of claim 16, further including automatically detecting any duplication of data transfer objects (DTOs) that may result from conversion of a Java service to a REST service.

18. The method of claim 16, further including providing one or more statistics or metrics pertaining to the one or more services, wherein the one or more statistics include a first metric indicating a number of services included among the one or more services, which are to be converted to REST services, and wherein the one more statistics or metrics include one or more indications of one or more program packages to be modified for use with one or more REST services.

19. An apparatus comprising:
a digital processor coupled to a display and to a processor-readable storage device, wherein the processor-readable storage device includes one or more instructions executable by the digital processor to perform one or more operations comprising:
employing one or more predicates to query one or more initial services in a computing environment, wherein the query includes filtering based on one or more packages, one or more classes, and one or more methods;
producing a first result in response thereto, wherein the first result indicates one or more target services that are compiled code;
using reflection to analyze the one or more target services;
producing a second result in response to the using of the reflection;
analyzing the second result to determine if the one or more target services meet a criterion for conversion to one or more Representational State Transfer (REST) services, yielding a third result in response thereto, wherein the analyzing includes function point complexity and effort estimation;
providing indications of one or more discovered services based on the third result; and
converting the one or more discovered services into one or more REST services by automatically generating computer code implementing the REST services yielded in the third result.

20. A processor-readable storage device including instructions executable by a digital processor, the processor-readable storage device including one or more instructions for:
employing one or more predicates to query one or more initial services in a computing environment, wherein the query includes filtering based on one or more packages, one or more classes, and one or more methods;
producing a first result in response thereto, wherein the first result indicates one or more target services that are compiled code;
using reflection to analyze the one or more target services;
producing a second result in response to the using of the reflection;
analyzing the second result to determine if the one or more target services meet a criterion for conversion to one or more Representational State Transfer (REST) services, yielding a third result in response thereto, wherein the analyzing includes function point complexity and effort estimation;
providing indications of one or more discovered services based on the third result; and
converting the one or more discovered services into one or more REST services by automatically generating computer code implementing the REST services yielded in the third result.

* * * * *